(12) United States Patent
Nielsen et al.

(10) Patent No.: US 11,903,530 B2
(45) Date of Patent: Feb. 20, 2024

(54) HANGING APPARATUS FOR BATHING ACCESSORIES

(71) Applicant: Best Cousins LLC, Las Vegas, NV (US)

(72) Inventors: Glen Nielsen, Las Vegas, NV (US); Samantha Brandel, Las Vegas, NV (US)

(73) Assignee: Best Cousins LLC, Las Vegas, NV (US)

( * ) Notice: Subject to any disclaimer, the term of this patent is extended or adjusted under 35 U.S.C. 154(b) by 0 days.

(21) Appl. No.: 17/713,900

(22) Filed: Apr. 5, 2022

(65) Prior Publication Data
US 2022/0322891 A1 Oct. 13, 2022

Related U.S. Application Data

(60) Provisional application No. 63/173,676, filed on Apr. 12, 2021.

(51) Int. Cl.
| | | |
|---|---|---|
| *A47K 10/14* | (2006.01) | |
| *A47K 3/28* | (2006.01) | |
| *A47K 10/12* | (2006.01) | |
| *F16M 13/02* | (2006.01) | |

(52) U.S. Cl.
CPC .............. *A47K 10/14* (2013.01); *A47K 3/281* (2013.01); *A47K 10/12* (2013.01); *F16M 13/02* (2013.01); *A47K 2201/00* (2013.01)

(58) Field of Classification Search
CPC ........ F16M 13/02; A47K 3/281; A47K 10/12; A47K 10/14; A47K 2201/00

USPC .......................................................... 248/303
See application file for complete search history.

(56) References Cited

U.S. PATENT DOCUMENTS

| | | | | | |
|---|---|---|---|---|---|
| 132,846 | A | * | 11/1872 | McArthur .............. | A01K 31/06 248/303 |
| 725,678 | A | * | 4/1903 | Cullum .................. | A47G 7/045 126/299 R |
| 755,553 | A | * | 3/1904 | Snell ...................... | F16M 13/00 248/316.1 |
| 1,260,168 | A | * | 3/1918 | Engle .................... | A47G 25/065 248/303 |
| 1,933,218 | A | * | 10/1933 | Miller .................... | A01G 17/04 248/303 |
| 2,208,152 | A | * | 7/1940 | Badhorn ................ | A47G 29/10 248/303 |
| 2,663,530 | A | * | 12/1953 | Nye ....................... | A47K 10/12 248/205.5 |

(Continued)

*Primary Examiner* — Bradley Duckworth
(74) *Attorney, Agent, or Firm* — Knobbe Martens Olson & Bear, LLP

(57) ABSTRACT

Various hanging assemblies are disclosed. The hanging assembly can be configured to hold a bathing accessory, such as a loofa or a bath sponge, to more effectively dry the bathing accessory between uses. The hanging assembly can include a hanging apparatus and an adhesive component configured to adhere the hanging apparatus to a surface, such as a shower wall. The hanging assembly can include a base portion, a hook portion, and an intermediate portion extending between the base portion and the hook portion. The base portion can include a proximal side opposite a distal side. The adhesive component can be applied to the proximal side of the base portion to adhere the hanging apparatus to the surface.

19 Claims, 7 Drawing Sheets

(56) References Cited

U.S. PATENT DOCUMENTS

| | | | | |
|---|---|---|---|---|
| 2,927,759 | A * | 3/1960 | Fischel | A47G 1/1606 248/222.51 |
| 5,967,476 | A * | 10/1999 | Chen | A47G 1/20 248/304 |
| 6,609,689 | B1 * | 8/2003 | Knapp | A47K 10/12 248/205.8 |
| 6,810,538 | B2 * | 11/2004 | Ouyoung | A47K 10/12 211/105.1 |
| 7,243,888 | B2 * | 7/2007 | Peek | G09B 23/36 434/296 |
| 8,132,766 | B2 * | 3/2012 | Tooley | A47K 10/10 248/205.5 |
| 8,272,610 | B2 * | 9/2012 | Ernst | A47L 13/16 248/302 |
| 8,556,224 | B2 * | 10/2013 | Kharchenko | A47K 10/10 248/205.3 |
| 9,422,970 | B1 * | 8/2016 | Fan | A47K 10/12 |
| 9,795,260 | B2 * | 10/2017 | Castellini | A47K 3/281 |
| 10,307,022 | B1 * | 6/2019 | Cole | A47K 10/12 |
| 2002/0113183 | A1 * | 8/2002 | Mattesky | A47F 5/0823 248/303 |
| 2008/0296244 | A1 * | 12/2008 | Tomassetti | A47K 3/281 211/119.009 |
| 2013/0168517 | A1 * | 7/2013 | Chu | A47K 10/12 248/304 |
| 2014/0203153 | A1 * | 7/2014 | Lan | A47G 29/00 248/205.1 |
| 2018/0231176 | A1 * | 8/2018 | Sabounjian | F16M 13/02 |
| 2018/0245735 | A1 * | 8/2018 | Forrest | A47G 1/17 |
| 2019/0257469 | A1 * | 8/2019 | Ullah | F16M 13/022 |
| 2021/0079585 | A1 * | 3/2021 | Herny | D06F 57/12 |
| 2021/0364027 | A1 * | 11/2021 | Cogburn | A47G 25/0607 |
| 2022/0257015 | A1 * | 8/2022 | Sisto | A47B 96/061 |

* cited by examiner

HANGING APPARATUS FOR BATHING ACCESSORIES

INCORPORATION BY REFERENCE

This application claims the priority benefit of U.S. Provisional Application No. 63/173,676, filed Apr. 12, 2021, which is hereby incorporated by reference in its entirety herein. Any and all applications for which a foreign or domestic priority claim is identified in the Application Data Sheet as filed with the present application are hereby incorporated by reference under 37 CFR 1.57.

BACKGROUND

Field

This present application generally relates to apparatuses for hanging bathing accessories.

Description of Certain Related Art

Many people use a loofah, a bath sponge, a small towel, or other bathing accessories when they shower or bathe. Between uses, people often leave the bathing accessory on the floor of the bath or shower or a shelf of the bath or shower. Alternatively, people may store the bathing accessory somewhere in their home outside of their bath or shower.

SUMMARY

Storing a bathing accessory on a floor or shelf of a bath or shower may not allow the bathing accessory to fully dry between uses. If the bathing accessory is left wet or damp for extended periods of time, this can lead to bacteria growth within the bathing accessory. Rather than storing the bathing accessory on the floor or the shelf of the shower or bath, a person could hang the bathing accessory on the shower's or bath's handle. However, the bathing accessory may contact the wall of the shower or bath, which could lead to water from the bathing accessory dripping along the wall and creating stains on the wall. Moreover, the part of the bathing accessory contacting the wall may still remain damp between uses. Thus, it would be beneficial for the bathing accessory to be hung in the bath or shower with a sufficient amount of space between the bathing accessory and any of the surfaces in the bath or shower to allow the bathing accessory to effectively dry between uses.

The hanging apparatus disclosed herein address one or more of the above concerns, or other concerns.

In some aspects of the disclosure, a hanging assembly for hanging a bathing accessory is disclosed. The hanging assembly may comprise a hanging apparatus and an adhesive component. The hanging apparatus may comprise a base portion, hook portion, and an intermediate portion. The base portion can comprise a proximal side opposite a distal side. The hook portion can be configured to hold the bathing accessory. The intermediate portion can comprise an elongate structure extending between the base portion and the hook portion. The adhesive component can be configured to adhere the hanging apparatus to a surface.

The hanging assembly can include one or more of the following features. The hanging apparatus can comprise a plastic material, a metal material, a wood material, or a combination thereof. The adhesive material can be configured to be replaceable. The hook portion can comprise a curved shape. The base portion can comprise a generally square or rectangular shape. The surface can comprise a shower wall or a bath wall. The adhesive component can be configured to removably adhere the hanging apparatus to the surface. The adhesive component can be configured to removably adhere to the proximal side of the base portion of the hanging apparatus. The adhesive component can comprise an adhesive coating.

For purposes of summarizing the disclosure, certain aspects, advantages, and features of the technology have been described herein. Not necessarily any or all such advantages are achieved in accordance with any particular embodiment of the technology disclosed herein. No aspects of this disclosure are essential or indispensable. Neither the preceding summary nor the following detailed description purports to limit or define the scope of protection. The scope of protection is defined by the claims.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

DETAILED DESCRIPTION

Reference will now be made in detail to various embodiments of the present technology, which relates to a hanging apparatus. Although certain specific embodiments of the present technology are described, the present technology is not limited to these embodiments. On the contrary, these described embodiments are merely illustrative of the present technology, and the present technology is intended to also cover alternatives, modifications, and equivalents. Furthermore, in the following detailed description, numerous specific details are set forth in order to provide a thorough understanding of the present technology. However, it will be recognized by one of ordinary skill in the art that embodiments can be practiced without these specific details. In some instances, well known methods, procedures, compounds, compositions and mechanisms have not been described in detail as not to unnecessarily obscure aspects of embodiments of the present technology.

FIGS. 1-7 illustrate an embodiment of a hanging apparatus 100. In some configurations, the hanging apparatus 100 can be configured to hold a bathing accessory (e.g., a loofah, a bath sponge). In some configurations, the hanging apparatus 100 can comprise one or more materials. For example, the one or more materials can include a plastic material, a metal material, a wood material, or any other suitable material(s) or combination of materials.

Figure 1:
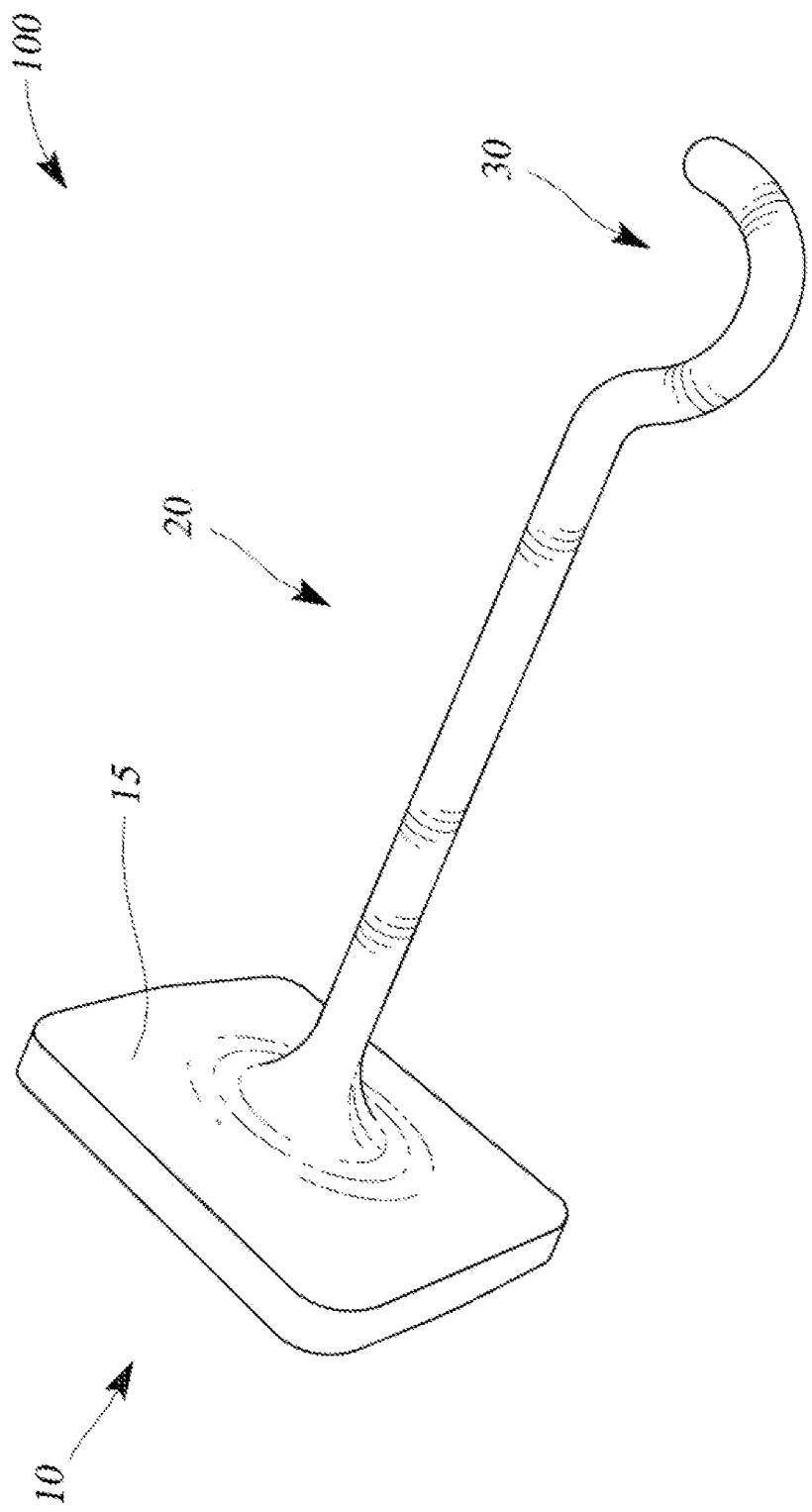
FIG. 1 shows a perspective view of an embodiment of a hanging apparatus illustrating certain aspects of the present disclosure.

As shown in FIG. 1, the hanging apparatus 100 can include a first portion 10 (also called a base or a base portion), a second portion 20 (also called an intermediate portion), and a third portion 30 (also called a hook or a hook portion). As shown in the illustrated configurations, the base 10 can include a generally square shape. In some configurations, the base 10 can include a triangular shape, a rectangular shape, a hexagonal shape, an octagonal shape, or other geometric shapes. In some configurations, the base 10 can include a non-geometric shape, such as a shape of an animal (e.g., a dog, a cat, a bird), a star, a rainbow, or a car.

Figure 2:
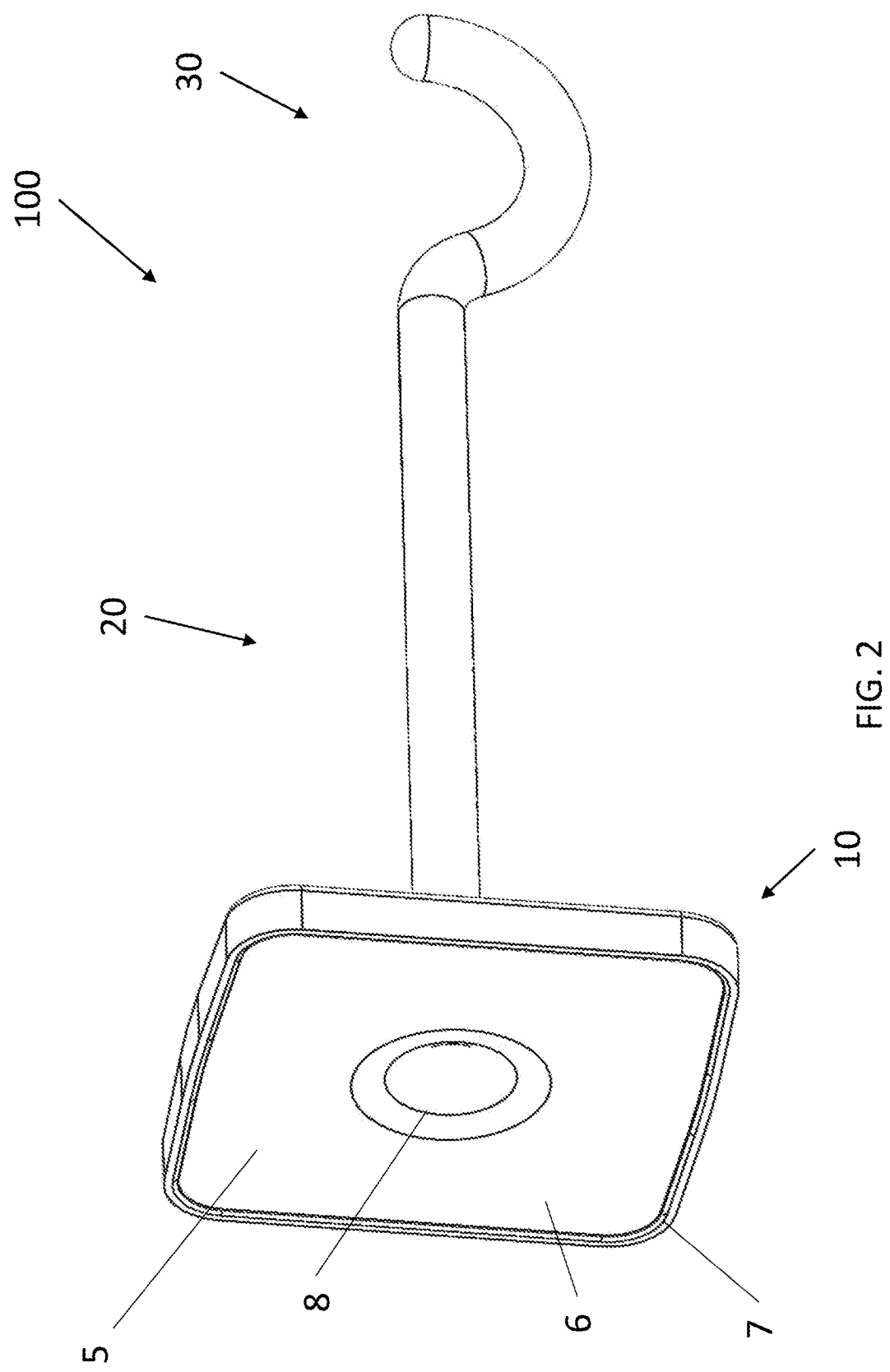
FIG. 2 shows a different perspective view of the hanging apparatus.
Figure 3:
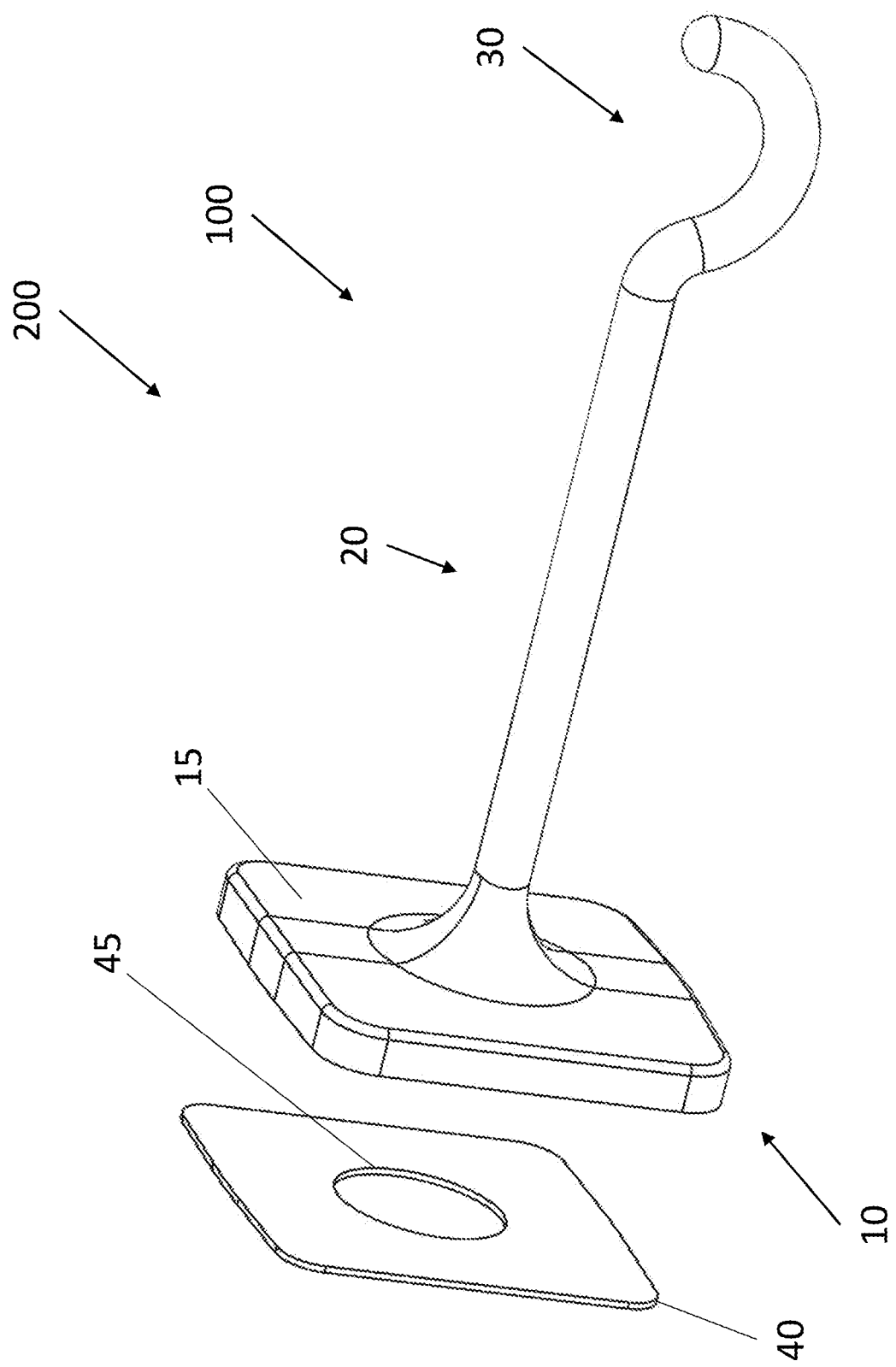
FIG. 3 shows a perspective view of the hanging apparatus and an adhesive component.

As shown in FIGS. 2-3, the base or base portion 10 can include a proximal side 5 opposite a distal side 15. In some configurations, the base 10 may include a thickness measured between the proximal side 5 and the distal side 15. The proximal side 5 can include a central portion 6 and an outer rim 7. As shown in FIG. 2, the outer rim 7 can include a height measured from the central portion 6 to the edge of the outer rim 7. In some configurations, the outer rim 7 can be continuous with the central portion 6 such that the outer rim 7 and the central portion 6 define a substantially flat surface.

Figure 7:
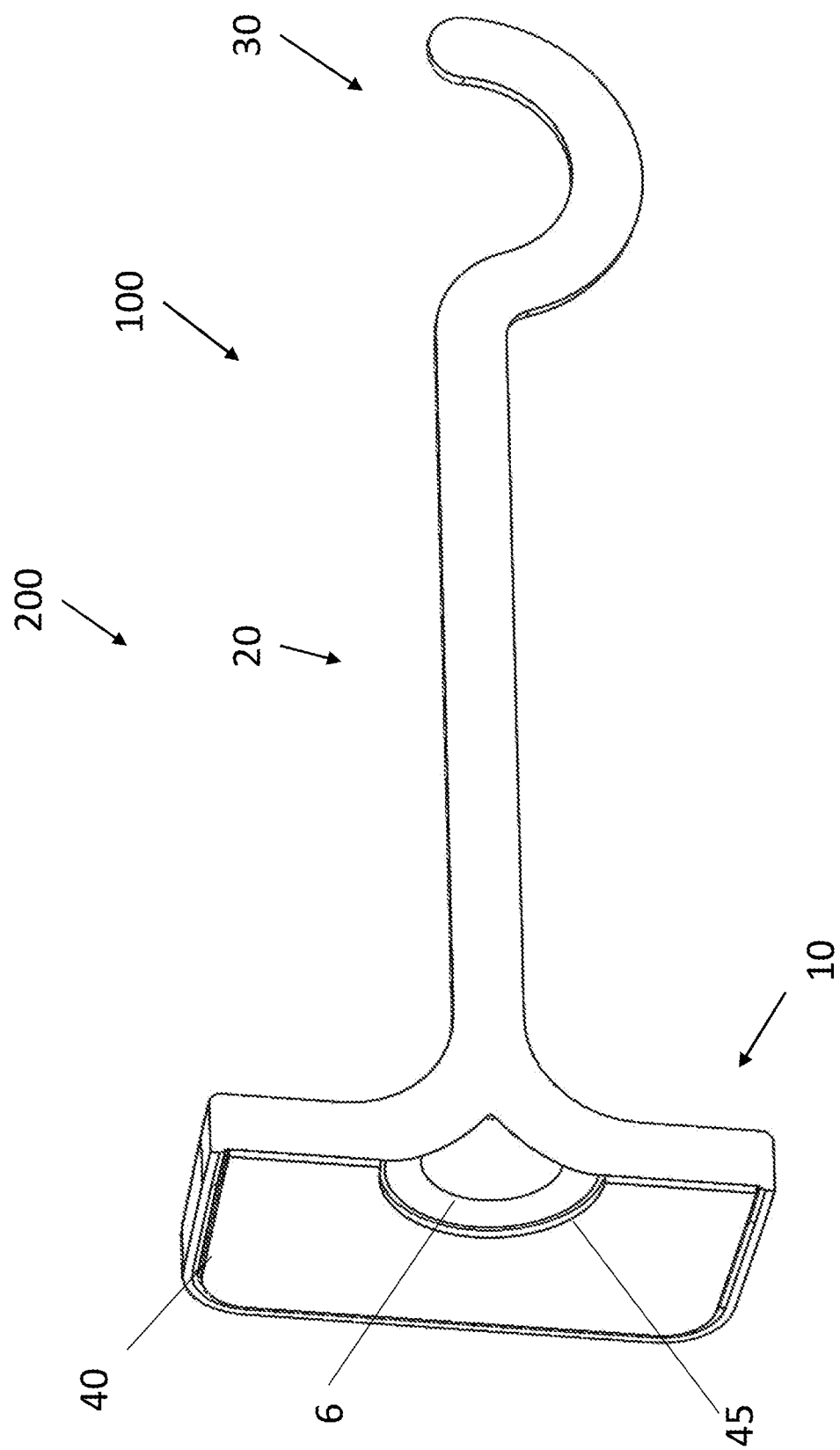
FIG. 7 shows a cross-sectional view of the hanging apparatus with the adhesive component along a longitudinal axis of the hanging apparatus.

As shown in the illustrated configurations, the central portion 6 of the proximal side 5 can define a discontinuous surface. For example, the central portion 6 can include an aperture 8. The aperture 8 can be positioned at or near the center of the central portion 6 and extend into the base portion 5 toward the distal side 15 (FIG. 7). In some configurations, the aperture 8 can be positioned at any suitable location on the proximal side 5. In some configurations, the central portion 6 can include a plurality of apertures. In some configurations, the central portion 6 can define a continuous surface with no apertures.

As previously discussed, the hanging apparatus 100 can include the intermediate portion 20. As shown in the illustrated configurations, the intermediate portion 20 can extend from the distal side 15 of the base 10 to the hook portion 30. In some configurations, the intermediate portion 20 can extend from a center or near the center of the distal side 15 of the base 10. For example, the intermediate portion 20 can align with the aperture 8 of the base portion 10. The intermediate portion 20 can comprise a generally elongate structure. For example, intermediate portion 20 can be substantially cylindrical, as shown in the illustrated configurations, or any other suitable shape. In some configurations, the intermediate portion 20 can be linear, as shown in the illustrated configurations, or nonlinear (e.g., a sinusoidal shape). In some configurations, the intermediate portion 20 may have a varying diameter. For example, a portion of the intermediate portion 20 closest to the base 10 may have a greater diameter than other portions of the intermediate portion 20. In some configurations, the intermediate portion 20 may have a constant diameter. In some configurations, the intermediate portion 20 can include a length measured between the distal side 15 of the base 10 and the hook portion 30. The length of the intermediate portion 20 may be a sufficient length such that a bathing accessory (e.g., a loofah or a bath sponge) may hang on the hook portion 30 without touching a wall (e.g., a shower or bath wall) when the hanging apparatus 100 is installed on the wall. For example, the intermediate portion 20 may be four inches in length. In some configurations, the intermediate portion may be 3-5 inches in length. In some configurations, an angle between the distal side 15 of the base 10 and a longitudinal axis 25, illustrated in FIG. 4, of the intermediate portion 20 can be between approximately 100° and approximately 30°, between approximately 85° and approximately 45°, between approximately 70° and approximately 60°, or approximately 90°.

Figure 4:
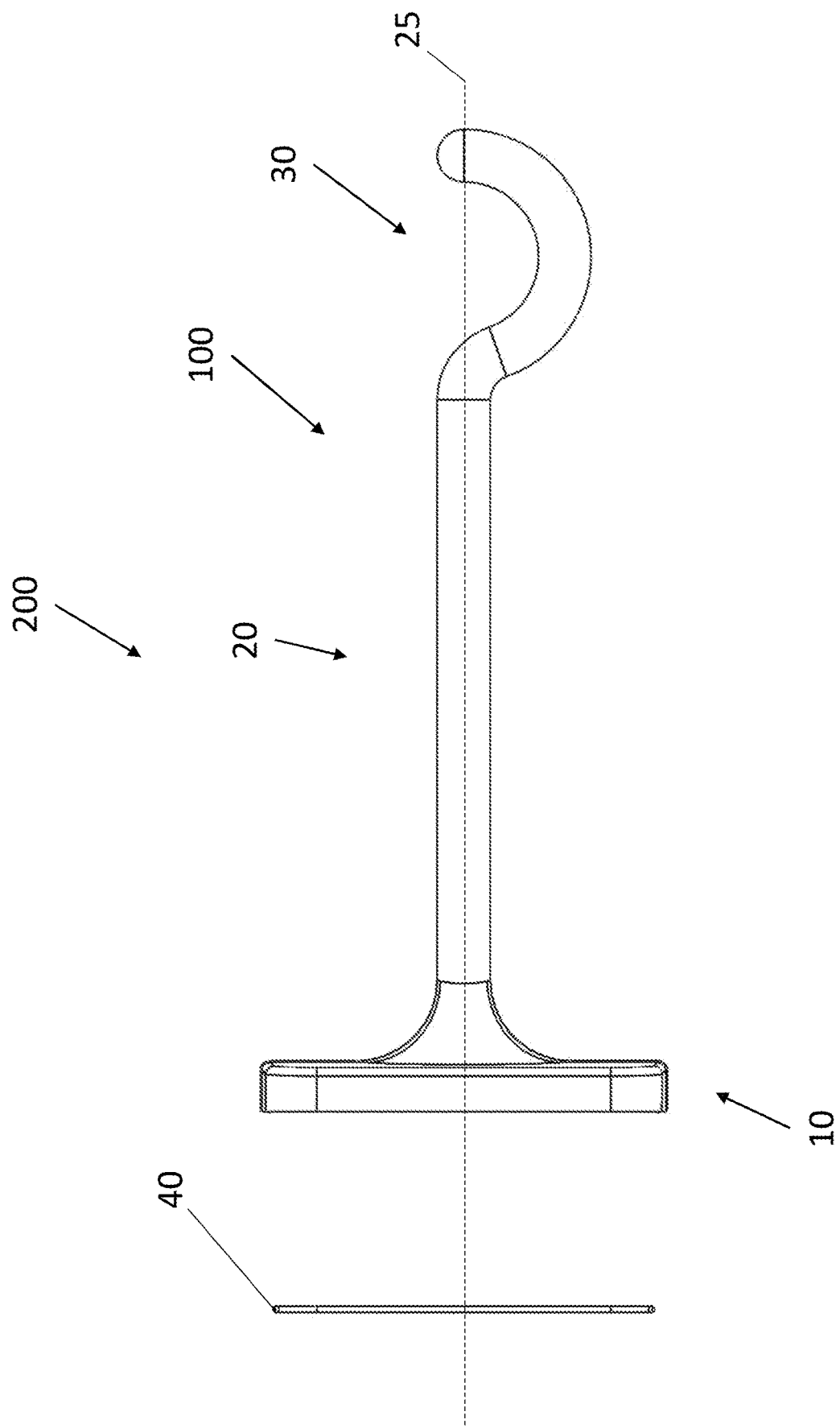
FIG. 4 shows a first side view of the hanging apparatus and the adhesive component.
Figure 5:
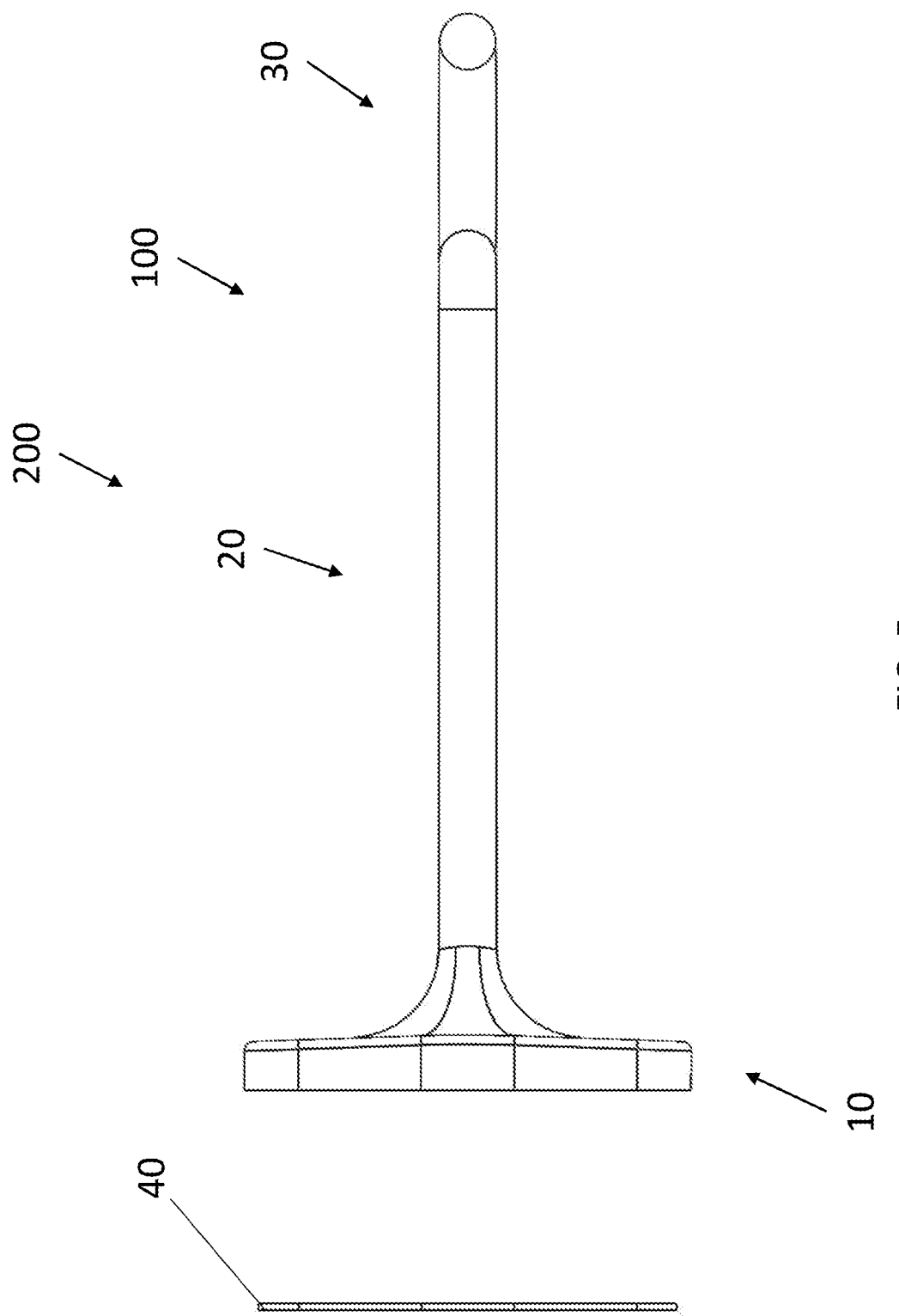
FIG. 5 shows a second side view of the hanging apparatus and the adhesive component, wherein the second side is normal to the first side shown in FIG. 4.
Figure 6:
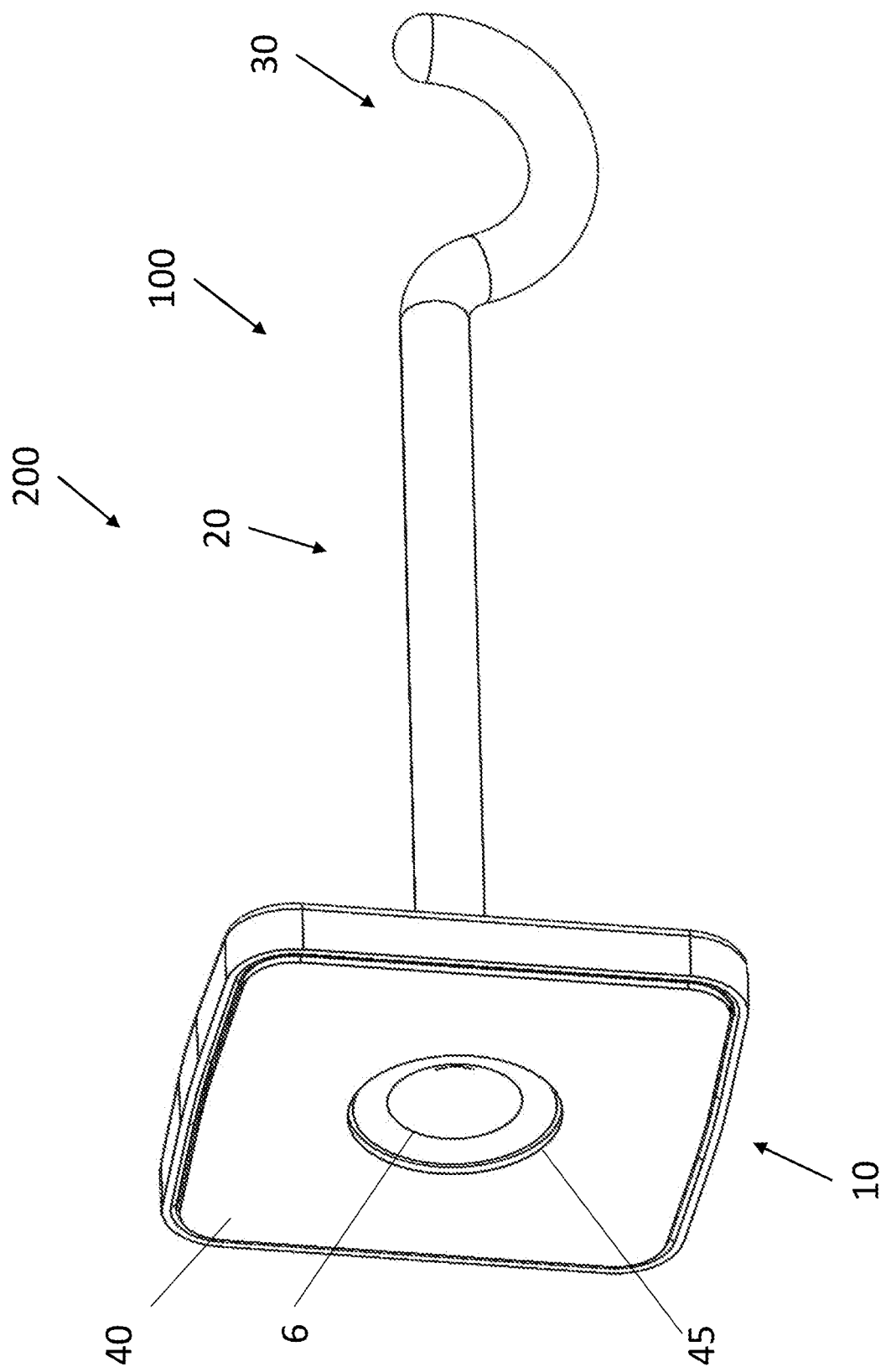
FIG. 6 shows a perspective view of the hanging apparatus with the adhesive component attached.

As discussed above, the hanging apparatus 100 can include a hook portion 30 extending from the intermediate portion 20. The hook portion 30 may be configured to hold the bathing accessory. As shown in the illustrated configurations, the hook portion 30 may have a generally curved or a partially circular shape as viewed from a side of the hanging apparatus 100 (FIG. 4). Alternatively, the hook portion 30 can include any suitable shape for holding a bathing accessory. For example, the hook portion 30 can have a generally triangular shape, a generally rectangular shape, a generally hexagonal shape, a generally octagonal shape, or other geometric or non-geometric shapes. In alternate configurations, the hanging apparatus 100 may not include the hook portion 30. For example, the intermediate portion 20 can comprise a cylindrical structure extending between a proximal end attached to the base 10 and a distal end opposite the proximal end. The intermediate portion 20 can be angled relative to the base 10 such that a user can hang a bathing accessory on the intermediate portion 20. For example, after the hanging apparatus 100 is attached to a wall, the distal end of the intermediate portion 20 can be angled above the proximal end of the intermediate portion 20.

FIGS. 3-7 illustrate an embodiment of a hanging assembly 200. The hanging assembly 200 can include the hanging apparatus 100 and an adhesive component 40, which can also be referred to as a coupling component. As shown in the illustrated configurations, the adhesive component 40 may be applied to the proximal side 5 of the hanging apparatus 100. For example, the adhesive component 40 may be applied to the central portion 6 of the proximal side 5. The adhesive component 40 may have a thickness that corresponds to the height of the outer rim 7 of the proximal side 5 such that a proximal face of the adhesive component 40 can be flush with the edge of the outer rim 7. In some configurations, the thickness of the adhesive component 40 may be greater than the height of the outer rim 7.

The adhesive component 40 may, for example, include an aperture 45. The aperture 45 can align with the aperture 8 of the base portion 10. In some configurations the aperture 45 can be positioned in any suitable location on the adhesive component 40. In some configurations, the adhesive component 40 may include a plurality of apertures. In some configurations, the adhesive component 40 can be a solid, continuous component with no apertures. The adhesive component 40 can be configured to adhere the base 10 to a surface (e.g., a wall of a shower). In some configurations, the adhesive component 40 can be configured to removably adhere the base 10 to the surface such that the user may repeatedly remove and reapply the hanging apparatus 100 to the same surface or different surfaces. For example, the user may apply the hanging apparatus 100 to a first location on a wall, remove the hanging apparatus 100 from the first location and reapply the hanging apparatus 100 to a different location or the same location on the wall. In some configurations, the adhesive component 40 can be configured to be replaceable such that the user can remove a first adhesive component 40 and apply a second adhesive component 40 to the proximal side 5 of the base portion 10. For example, after multiple uses, the first adhesive component 40 may lose effectiveness and may no longer be able to adhere the hanging apparatus 100 to the surface. The adhesive component 40 can be adhesive tape or strip, which can include a double sided adhesive tape or strip. In some configurations, the proximal side 5 may include alternative means for adhering the hanging apparatus 100 to a wall, such as a magnet(s), suction cup(s), hook and loop fastener(s) (e.g., VELCRO®), and/or an adhesive coating. In some configurations, the entire length of the hanging apparatus 100 and/or hanging assembly 200 can be 4.82 inches. In some configurations, the entire length of the hanging apparatus 100 and/or hanging assembly 200 can be 4-7 inches in length.

The terms "first" and "second" are merely numbered for describing corresponding technical features clearly and do not represent the actual order. During particular implementations, the locations of the technical features defined by the terms "first" and "second" are interchangeable.

Terms of orientation used herein, such as "top," "bottom," "horizontal," "vertical," "longitudinal," "lateral," "outer," "inner," and "end" are used in the context of the illustrated embodiment. However, the present disclosure should not be limited to the illustrated orientation. Indeed, other orientations are possible and are within the scope of this disclosure. Terms relating to circular shapes as used herein, such as "diameter" or "radius," should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

The terms "approximately," "about" and "substantially" as used herein represent an amount close to the stated amount that still performs a desired function or achieves a desired result. For example, in some embodiments, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Conditional language, such as "can," "could," "might," or "may," unless specifically stated otherwise or otherwise understood within the context as used, is generally intended to convey that certain embodiments include or do not include, certain features, elements and/or steps. Thus, such conditional language is not generally intended to imply that features, elements and/or steps are in any way required for one or more embodiments.

Conjunctive language, such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require the presence of at least one of X, at least one of Y and at least one of Z.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed and/or rearranged. Further, the disclosure herein of any particular feature, aspect, method, property, characteristic, quality, attribute, element or the like in connection with various embodiments can be used in all other embodiments set forth herein. Additionally, any methods described herein may be practiced using any device suitable for performing the recited steps.

Although this invention has been disclosed in the context of certain embodiments and examples, the scope of this disclosure extends beyond the specifically disclosed embodiments to other alternative embodiments and/or uses of the invention and obvious modifications and equivalents thereof. Any system, method, and device described in this application can include any combination of the preceding features described in this and other paragraphs, among other features and combinations described herein, including features and combinations described in subsequent paragraphs. While several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Various features and aspects of the disclosed embodiments can be combined with or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A hanging assembly for hanging a bathing accessory, the hanging assembly comprising:
    a hanging apparatus comprising:
        a base portion comprising a proximal side opposite a distal side,
        a hook portion configured to hold the bathing accessory, and
        an intermediate portion comprising an elongate structure extending between the base portion and the hook portion, wherein the intermediate portion comprises an outer cross-sectional periphery that gradually increases as the intermediate portion approaches the base portion and curves radially outward relative to a center longitudinal axis of the elongate structure; and
    an adhesive component configured to adhere the hanging apparatus to a surface;
    wherein the proximal side of the base portion comprises a recess to receive the adhesive component such that the adhesive component is substantially flush with a proximal wall of the base portion surrounding the recess; and
    wherein the proximal side of the base portion comprises a first aperture with a curved cone shape, wherein walls of the proximal side defining the first aperture curve radially inward toward the center longitudinal axis of the elongate structure.

2. The hanging assembly of claim 1, wherein the adhesive component is configured to be replaceable.

3. The hanging assembly of claim 1, wherein the hook portion comprises a curved shape.

4. The hanging assembly of claim 1, wherein the adhesive component is configured to removably adhere the hanging apparatus to the surface.

5. The hanging assembly of claim 1, wherein the adhesive component is configured to removably adhere to the proximal side of the base portion of the hanging apparatus.

6. The hanging assembly of claim 1, wherein the adhesive component comprises an adhesive coating.

7. The hanging apparatus of claim 1, wherein the adhesive component comprises an adhesive strip.

8. The hanging apparatus of claim 1, wherein the intermediate portion comprises a cylindrical shape.

9. The hanging apparatus of claim 1, wherein the intermediate portion comprises a longitudinal length that is four inches.

10. The hanging apparatus of claim 1, wherein the intermediate portion comprises a longitudinal length that is three to five inches.

11. The hanging apparatus of claim 1, wherein the hanging apparatus comprises a longitudinal length that is 4-7 inches.

12. The hanging assembly of claim 1, wherein the adhesive component comprises a second aperture that is configured to be aligned with the first aperture with the adhesive component positioned within the recess of the proximal side of the base portion.

13. A hanging assembly for hanging a bathing accessory, the hanging assembly comprising:
    a hanging apparatus comprising:
        a base portion comprising a proximal side opposite a distal side,
        a hook portion configured to hold the bathing accessory, and
        an intermediate portion comprising an elongate structure comprising a length extending between the base portion and the hook portion, wherein the intermediate portion comprises an outer cross-sectional periphery that gradually increases as the intermediate portion approaches the base portion and curves radially outward relative to a center longitudinal axis of the elongate structure; and
    a coupling component configured to couple the hanging apparatus to a surface;
    wherein the length of the intermediate portion is configured to space the bathing accessory away from the surface such that the bathing accessory does not contact the surface to facilitate drying;
    wherein the proximal side of the base portion comprises a recess to receive the coupling component such that the coupling component is substantially flush with a proximal wall of the base portion surrounding the recess; and
    wherein the proximal side of the base portion comprises a first aperture with a curved cone shape, wherein walls of the proximal side defining the first aperture curve radially inward toward the center longitudinal axis of the elongate structure.

14. The hanging assembly of claim 13, wherein the length of the intermediate portion is 3-5 inches.

15. The hanging assembly of claim 13, wherein the coupling component comprises an adhesive strip.

16. The hanging assembly of claim 13, wherein the coupling component comprises a suction cup.

17. The hanging assembly of claim 13, wherein the coupling component comprises a hook and loop fastener.

18. The hanging assembly of claim 13, wherein the elongate structure comprises a cylindrical shape.

19. The hanging assembly of claim 13, wherein the coupling component comprises a second aperture that is configured to be aligned with the first aperture with the coupling component positioned within the recess of the proximal side of the base portion.

\* \* \* \* \*